United States Patent
Pawson

(10) Patent No.: US 7,512,698 B1
(45) Date of Patent: Mar. 31, 2009

(54) DYNAMIC QUALITY ADJUSTMENT BASED ON CHANGING STREAMING CONSTRAINTS

(75) Inventor: David J. Pawson, San Mateo, CA (US)

(73) Assignee: Broadband Royalty Corporation, Wilmington, DE (US)

( * ) Notice: Subject to any disclaimer, the term of this patent is extended or adjusted under 35 U.S.C. 154(b) by 590 days.

(21) Appl. No.: 09/653,039

(22) Filed: Sep. 1, 2000

Related U.S. Application Data

(63) Continuation-in-part of application No. 09/128,244, filed on Aug. 3, 1998, which is a continuation-in-part of application No. 08/859,860, filed on May 21, 1997, now Pat. No. 5,864,682, which is a continuation of application No. 08/502,480, filed on Jul. 14, 1995, now Pat. No. 5,659,539.

(51) Int. Cl.
*G06F 15/16* (2006.01)
(52) U.S. Cl. ................. 709/231; 709/224; 709/226; 709/228; 709/232; 709/246
(58) Field of Classification Search ......... 709/246, 709/219, 228, 231–233, 234, 247, 224, 226; 370/468; 348/484, 512, 563, 564, 552
See application file for complete search history.

(56) References Cited

U.S. PATENT DOCUMENTS

| | | | | |
|---|---|---|---|---|
| 5,231,492 A | * | 7/1993 | Dangi et al. | ................. 348/484 |
| 5,253,341 A | | 10/1993 | Roamanith et al. | |
| 5,267,351 A | | 11/1993 | Reber et al. | |
| 5,327,176 A | * | 7/1994 | Forler et al. | ................. 348/564 |

(Continued)

FOREIGN PATENT DOCUMENTS

EP 0396062 11/1990

(Continued)

OTHER PUBLICATIONS

Christ P. et al., "RTSP-based Stream Control in MPEG-4" IETF IETF, CH, Nov. 16, 1998, XP015011796 ISSN: 0000-0004.

(Continued)

*Primary Examiner*—Ramy M Osman
(74) *Attorney, Agent, or Firm*—FSP LLC

(57) ABSTRACT

A method and apparatus for dynamic quality adjustment of digital media based on changing streaming constraints is provided. A digital media server sends a digital media stream according to a set of streaming constraints to a requesting client. Audio and visual information may be sent to a requesting client together in a single stream, or separately in multiple streams. A client sends a request over a control network to the digital media server indicating information of a particular type is no longer desired. In response to receiving the signal, the video server ceases transmission of that particular type of information to the signaling client, thus relaxing streaming constraints. As a result of the techniques described herein, an improved quality digital presentation is available for the client and, consequently, when a viewer signals that a particular type of information is not desired, that particular type of information is not transmitted to the client, which thereby reduces the streaming constraints on a video streaming service, and improved quality digital media information may be sent to any client using the freed-up portion of the bandwidth previously allocated to the signaling client.

10 Claims, 5 Drawing Sheets

U.S. PATENT DOCUMENTS

| | | | | |
|---|---|---|---|---|
| 5,467,139 | A | * 11/1995 | Lankford | 348/512 |
| 5,481,542 | A | 1/1996 | Logston et al. | |
| 5,502,494 | A | 3/1996 | Auld | |
| 5,513,011 | A | 4/1996 | Matsumoto et al. | |
| 5,521,630 | A | 5/1996 | Chen et al. | |
| 5,521,841 | A | 5/1996 | Arman et al. | |
| 5,526,350 | A | * 6/1996 | Gittins et al. | 370/468 |
| 5,528,282 | A | 6/1996 | Voeten et al. | |
| 5,543,861 | A | 8/1996 | Harradine et al. | |
| 5,553,005 | A | 9/1996 | Voeten et al. | |
| 5,559,999 | A | 9/1996 | Maturi et al. | |
| 5,566,174 | A | 10/1996 | Sato et al. | |
| 5,568,180 | A | 10/1996 | Okamoto | |
| 5,617,145 | A | * 4/1997 | Huang et al. | 348/423.1 |
| 5,659,539 | A | 8/1997 | Porter et al. | |
| 5,671,019 | A | * 9/1997 | Isoe et al. | 348/563 |
| 5,684,716 | A | 11/1997 | Freeman | 364/514 C |
| 5,808,660 | A | 9/1998 | Sekine et al. | 348/8 |
| 5,864,682 | A | 1/1999 | Porter et al. | 395/200.77 |
| 5,953,506 | A | 9/1999 | Kalra et al. | |
| 5,995,490 | A | * 11/1999 | Shaffer et al. | 370/468 |
| 6,014,694 | A | * 1/2000 | Aharoni et al. | 709/219 |
| 6,038,257 | A | 3/2000 | Brusewitz et al. | 375/240 |
| 6,075,768 | A | * 6/2000 | Mishra | 370/229 |
| 6,128,649 | A | * 10/2000 | Smith et al. | 709/217 |
| 6,172,672 | B1 | * 1/2001 | Ramasubramanian et al. | 345/720 |
| 6,175,822 | B1 | * 1/2001 | Jones | 704/270 |
| 6,373,855 | B1 | * 4/2002 | Downing et al. | 370/468 |
| 6,404,776 | B1 | * 6/2002 | Voois et al. | 370/468 |
| 6,477,201 | B1 | * 11/2002 | Wine et al. | 375/240.08 |
| 6,487,721 | B1 | * 11/2002 | Safadi | 725/36 |
| 6,611,503 | B1 | * 8/2003 | Fitzgerald et al. | 725/95 |
| 6,628,300 | B2 | * 9/2003 | Amini et al. | 345/660 |
| 6,665,002 | B2 | * 12/2003 | Liu | 370/468 |
| 7,007,098 | B1 | * 2/2006 | Smyth et al. | 709/233 |
| 7,058,721 | B1 | * 6/2006 | Ellison et al. | 709/231 |

FOREIGN PATENT DOCUMENTS

| | | |
|---|---|---|
| EP | 0545323 A1 | 6/1993 |
| EP | 0605115 A2 | 7/1994 |
| EP | 0633694 A1 | 1/1995 |
| EP | 0653884 A1 | 5/1995 |
| WO | WO-96/20566 A1 | 7/1996 |
| WO | WO 97/15149 A1 | 4/1997 |
| WO | WO-97/16023 A1 | 5/1997 |
| WO | WO-98/34405 A1 | 8/1998 |

OTHER PUBLICATIONS

MMusic WG H. Shculzrinne et al., "Real Time Streaming Protocol (RTSP)", IETF Standard Working Draft, Internet Engineering Task Force, IETF, CH, vol. mmusic, No. 2, Mar. 27, 1997, XP015023142 ISSN: 0000-0004.

* cited by examiner

DYNAMIC QUALITY ADJUSTMENT BASED ON CHANGING STREAMING CONSTRAINTS

RELATED APPLICATION DATA

This application is a continuation-in-part application of copending U.S. application Ser. No. 09/128,244 filed on Aug. 3, 1998, which is a continuation-in-part application of U.S. application Ser. No. 08/859,860 filed on May 21, 1997, now U.S. Pat. No. 5,864,682 which is a continuation application of U.S. application Ser. No. 08/502,480 filed on Jul. 14, 1995, now U.S. Pat. No. 5,659,539, all of which are incorporated herein by reference in their entirety.

FIELD OF THE INVENTION

The present invention relates to a method and apparatus for processing audio-visual information, and more specifically, to a method and apparatus for providing improved quality digital media in response to relaxed streaming constraints.

BACKGROUND OF THE INVENTION

In recent years, the media industry has expanded its horizons beyond traditional analog technologies. Audio, photographs, and even feature films are now being recorded or converted into digital formats. Digital media's increasing presence in today's society is not without warrant, as it provides numerous advantageous over analog film. As users of the popular DVD format well know, digital media does not degrade from repeated use. Digital media can also either be delivered for presentation all at once, as when leaded by a DVD player, or delivered in a stream as needed by a digital media server.

As would be expected, the viewers of digital media desire at least the same functionality from the providers of digital media as they now enjoy while watching analog video tapes on video cassette recorders. For example, a viewer of a digital media presentation may wish to mute the audio just as one might in using analog videotapes and videocassette recorders. Currently, this is performed by adjusting the viewer's volume controls. However, as the server is unaware that audio information is not desired by the viewer, the server still continues to transmit audio information to the viewer. In a distributed digital media environment, the resulting waste in available bandwidth on the digital media server is considerable.

SUMMARY OF THE INVENTION

Techniques are provided for eliminating the waste in bandwidth on the digital media server when a particular type of data is not desired to be received by a user. Extra value is provided to a viewer by utilizing the bandwidth previously allocated to the client to send improved quality images or additional information, such as closed-captioned information. According to one aspect of the present invention, a digital media stream is sent to a client according to a set of streaming constraints. In one embodiment, the digital media stream contains both audio and visual information. According another embodiment, the digital media stream contains only visual information and a separate audio stream is sent to the client containing audio information. Next, a signal is received indicating a relaxation of streaming constraints corresponding to a particular type of data in the digital media stream. In one embodiment, the signal indicates the client is not to receive audio information. In another embodiment, the signal indicates the client is not to receive information of a particular type. In response to the signal, a set of improved quality media information is sent to the client.

According to one embodiment, a set of improved quality media information may be sent using the freed-up portion of the bandwidth previously allocated to the client. According to another embodiment, a set of improved quality media information may be sent to a first client using the freed-up portion of the bandwidth previously allocated to a second client. According to a further embodiment, the set of improved quality media information includes closed-captioned information.

As a result of the techniques described herein, an improved quality digital media stream is available for presentation to a client and, consequently, when a viewer requests to discontinue an undesired component of a streaming video presentation, the undesired information is not sent to the client, which thereby reduces the streaming constraints on a video streaming service, and the improved quality media information may be sent using the freed-up portion of the bandwidth previously allocated to the requesting client.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for dynamic quality adjustment based on changing streaming constraints is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, the various features of the invention shall be discussed under topic headings that appear in the following order:
 I. System Overview
 II. DIGITAL AUDIO/VIDEO FILE STRUCTURE
 III. MULTIPLEXOR OPERATIONS
 IV. FUNCTIONAL OPERATION

I. System Overview

Figure 1:
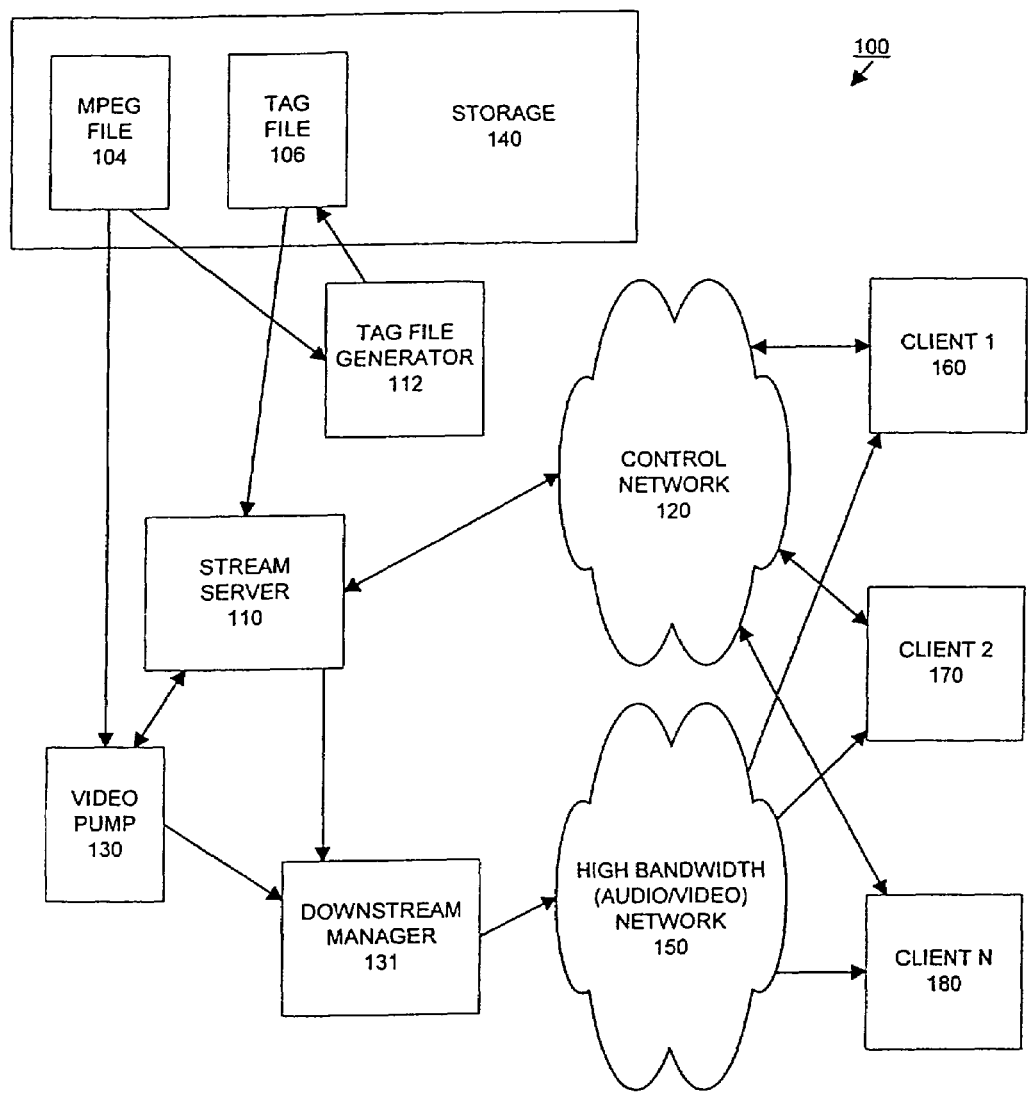
FIG. 1 is a block diagram of an audio-visual information delivery system according an embodiment of the present invention.

FIG. 1 is a block diagram illustrating an audio-visual information delivery system 100 according to one embodiment of the present invention. Audio-visual information delivery system 100 contains a plurality of clients (1-n) 160, 170 and 180. The clients (1-n) 160, 170 and 180 generally represent devices configured to decode audio-visual information contained in a stream of digital audio-visual data. For example, the clients (1-n) 160, 170 and 180 may be set top converter boxes coupled to an output display, such as a television.

As shown in FIG. 1, the audio-visual information delivery system 100 also includes a stream server 110 coupled to a control network 120. Control network 120 may be any network that allows communication between two or more devices. For example, control network 120 may be a high bandwidth network, an X.25 circuit or an electronic industry association (EIA) 232 (RS-232) serial line or an IP network.

The clients (1-n) 160, 170 and 180, also coupled to the control network 120, communicate with the stream server 110 via the control network 120. For example, clients 160, 170 and 180 may transmit requests to initiate the transmission of audio-visual data streams, transmit control information to affect the playback of ongoing digital audio-visual transmissions, or transmit queries for information. Such queries may include, for example, requests for information about which audio-visual data streams are currently available for service.

The audio-visual information delivery system 100 further includes a video pump 130, a mass storage device 140, and a high bandwidth network 150. The video pump 130 is coupled to the stream server 110 and receives commands from the stream server 110. The video pump 130 is coupled to the mass storage device 140 such that the video pump 130 retrieves data from the mass storage device 140. The mass storage device 140 may be any type of device or devices used to store large amounts of data. For example, the mass storage device 140 may be a magnetic storage device, an optical storage device, or a combination of such devices. The mass storage device 140 is intended to represent a broad category of non-volatile storage devices used to store digital data, which are well known in the art and will not be described further. While networks 120 and 150 are illustrated as different networks for the purpose of explanation, networks 120 and 150 may be implemented on a single network.

The tasks performed during the real-time transmission of digital media data streams are distributed between the stream server 110 and the video pump 130. Consequently, stream server 110 and video pump 130 may operate in different parts of the network without adversely affecting the efficiency of the system 100.

In addition to communicating with the stream server 110, the clients (1-n) 160, 170 and 180 receive information from the video pump 130 through the high bandwidth network 150. The high bandwidth network 150 may be any type of circuit-style network link capable of transferring large amounts of data, such as an IP network.

The audio-visual information delivery system 100 of the present invention permits a server, such as the video pump 130, to transfer large amounts of data from the mass storage device 140 over the high bandwidth network 150 to the clients (1-n) 160, 170 and 180 with minimal overhead. In addition, the audio-visual information delivery system 100 permits the clients (1-n) 160, 170 and 180 to transmit requests to the stream server 110 using a standard network protocol via the control network 120. In one embodiment, the underlying protocol for the high bandwidth network 150 and the control network 120 is the same. The stream server 110 may consist of a single computer system, or may consist of a plurality of computing devices configured as servers. Similarly, the video pump 130 may consist of a single server device, or may include a plurality of such servers.

To receive a digital audio-visual data stream from a particular digital audio-visual file, a client (1-n) 160, 170 or 180 transmits a request to the stream server 110. In response to the request, the stream server 110 transmits commands to the video pump 130 to cause video pump 130 to transmit the requested digital audio-visual data stream to the client that requested the digital audio-visual data stream.

The commands sent to the video pump 130 from the stream server 110 include control information specific to the client request. For example, the control information identifies the desired digital audio-visual file, the beginning offset of the desired data within the digital audio-visual file, and the address of the client. In order to create a valid digital audio-visual stream at the specified offset, the stream server 110 may also send "prefix data" to the video pump 130 and may request the video pump 130 to send the prefix data to the client. Prefix data is data that prepares the client to receive digital audio-visual data from the specified location in the digital audio-visual file.

The video pump 130, after receiving the commands and control information from the stream server 110, begins to retrieve digital audio-visual data from the specified location in the specified digital audio-visual file on the mass storage device 140.

The video pump 130 transmits any prefix data to the client, and then seamlessly transmits digital audio-visual data retrieved from the mass storage device 140 beginning at the specified location to the client via the high bandwidth network 150.

The requesting client receives the digital audio-visual data stream, beginning with any prefix data. The client decodes the digital audio-visual data stream to reproduce the encoded audio-visual sequence.

II. Digital Audio/Video File Structure

Having described the system overview of the audio-visual information delivery system 100, the format of the digital media, or audio-visual, file structure will now be described. Digital audio-visual storage formats, whether compressed or not, use state machines and packets of various structures. The techniques described herein apply to all such storage formats. While the present invention is not limited to any particular digital audio-visual format, the MPEG-2 transport file structure shall be described for the purposes of illustration.

Figure 2:
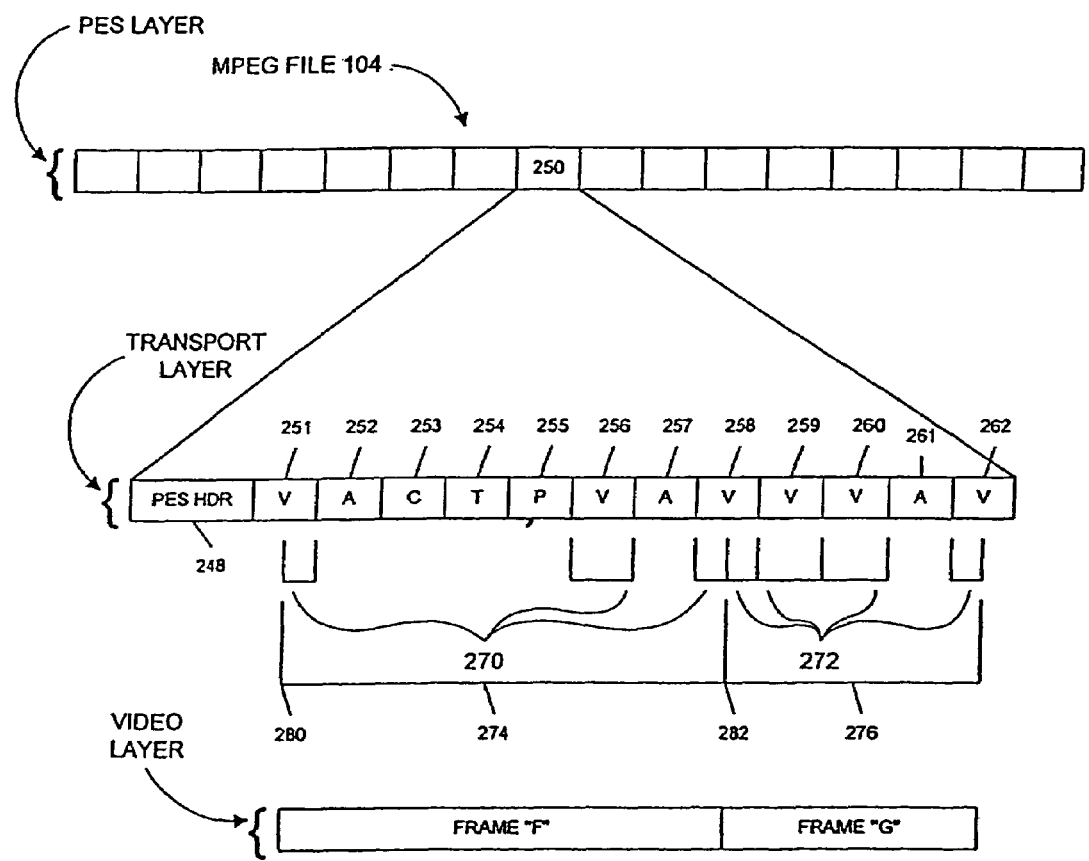
FIG. 2 illustrates the various layers of a digital media file according to one embodiment of the present invention.

Referring to FIG. 2, it illustrates the structure of an MPEG-2 transport file 104 in greater detail. The data within MPEG file 104 is packaged into three layers: a program elementary stream ("PES") layer, a transport layer, and a video layer. These layers are described in detail in the MPEG-2 specifications. At the PES layer, MPEG file 104 consists of a sequence of PES packets. At the transport layer, the MPEG file 104 consists of a sequence of transport packets. At the video layer, MPEG file 104 consists of a sequence of picture packets. Each picture packet contains the data for one frame of video.

Each PES packet has a header that identifies the length and contents of the PES packet. In the illustrated example, a PES packet 250 contains a header 248 followed by a sequence of transport packets 251-262. PES packet boundaries coincide with valid transport packet boundaries. Each transport packet contains exclusively one type of data. In the illustrated example, transport packets 251, 256, 258, 259, 260 and 262 contain video data. Transport packets 252, 257 and 261 contain audio data. Transport packet 253 contains control data. Transport packet 254 contains timing data. Transport packet 255 is a padding packet.

Each transport packet has a header. The header includes a program ID ("PID") for the packet. Packets assigned PID 0 are control packets. For example, packet 253 may be assigned PID 0. Control packets contain information indicative of what programs are present in the digital audio-visual data stream. Control packets associate each program with the PID numbers of one or more PMT packets, which contain Program Map Tables. Program Map Tables indicate what data types are present in a program, and the PID numbers of the packets that carry each data type. Illustrative examples of what data types may be identified in PMT packets include, but are not limited to, MPEG2 video, MPEG2 audio in English, and MPEG2 audio in French.

In the video layer, the MPEG file 104 is divided according to the boundaries of frame data. As mentioned above, there is no correlation between the boundaries of the data that represent video frames and the transport packet boundaries. In the illustrated example, the frame data for one video frame "F" is located as indicated by brackets 270. Specifically, the frame data for frame "F" is located from a point 280 within video packet 251 to the end of video packet 251, in video packet 256, and from the beginning of video packet 258 to a point 282 within video packet 258. Therefore, points 280 and 282 represent the boundaries for the picture packet for frame "F". The frame data for a second video frame "G" is located as indicated by brackets 272. The boundaries for the picture packet for frame "G" are indicated by bracket 276.

Many structures analogous to those described above for MPEG-2 transport streams also exist in other digital audio-visual storage formats, such as MPEG-1, Quicktime, and AVI. In one embodiment, indicators of video access points, time stamps, file locations, etc. are stored such that multiple digital audio-visual storage formats can be accessed by the same server to simultaneously serve different clients from a wide variety of storage formats. Preferably, all of the format specific information and techniques are incorporated in the stream server. All of the other elements of the server are format independent.

III. Multiplexor Operations

Figure 3:
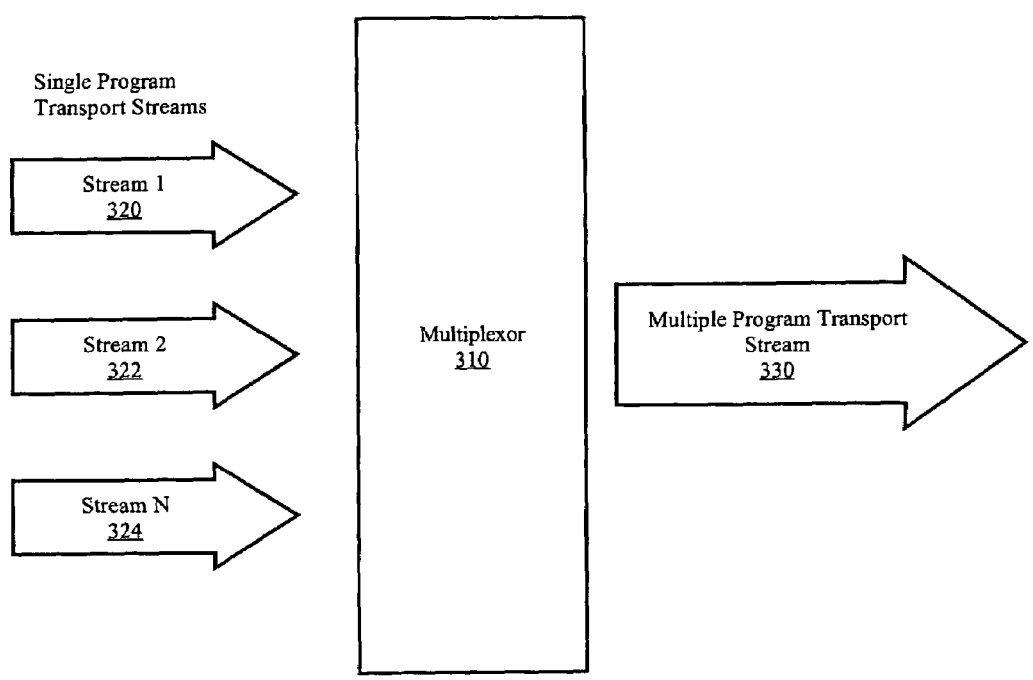
FIG. 3 illustrates the operation of a multiplexor according to an embodiment of the invention.

It is often desirable to merge several digital media presentations, each presentation in a separate digital media stream, into one stream containing the combined digital media presentations. This merger allows a user to select different digital media presentations to watch from a single digital media stream. FIG. 3 illustrates a multiplexor 310, which is a digital media component that performs the operation of merging multiple digital media streams into a single digital media stream. As multiplexors are well understood to those in the art, description in this section will be limited to the extent that it facilitates understanding of their use in optimizing mute operations in a multiplexed stream environment, which will be described in detail below.

As FIG. 3 shows, a multiplexor 310 has multiple inputs and a single output. The inputs to the multiplexor are called Single Program Transport Streams ("SPTS"), labeled as 320, 322, and 324, and the output is called a Multiple Program Transport Stream ("MPTS"), which is labeled as 330. A Single Program Transport Stream 320, 322, and 324 is a digital media stream that is encoded with audio and video data for one video presentation. Alternately, a Multiple Program Transport Stream 330 is a digital media stream that is encoded with audio and video data for multiple video presentations. Thus, a Single Program Transport Stream 320, 322, and 324 is analogous to a single channel on TV, whereas a Multiple Program Transport Stream 330 is analogous to a cable network.

When the individual SPTSs 320, 322, and 324 are combined, the multiplexor 310 examines the PID in each transport packet to ensure that each PID referenced in the control packets is unique. In the case when packets from different SPTSs 320, 322, and 324 use the same PID, the multiplexor 310 remaps the PIDs to unique numbers to ensure that each packet can easily be identified as belonging to a particular Single Program Transport Stream 320, 322, and 324. As each audio and video packet is guaranteed to have a unique PID, the video presentation to which the packet corresponds may be easily identified by examining the PID 0 control packets in the MPTS 330. Thus, as the multiplexor 310 must examine each table in the PID 0 control packets and all tables of packets references in the PID 0 control packets to ensure all referenced packets have a unique PID number, it also can easily identify all audio packets corresponding to a particular SPTS 320, 322, and 324.

IV. Functional Operation

A client may reduce the amount of a particular type of information contained in the digital media presentation that is received. In one embodiment, the amount of a particular type of information required by the client is reduced as the result of altering the presentation characteristics to a state requiring less of the particular type of information, such as when reducing the video resolution, or switching the sound output from stereo to mono. In another embodiment, the particular type of information is not required at all, such as when a client mutes the audio portion of a presentation. It is beneficial for the stream server 110 to reclaim the bandwidth previously allocated to delivering that particular type of information to the client. This extra bandwidth can be used to improve the quality of the digital media presentation, or to send additional information, such as closed-captioned information.

Figure 4:
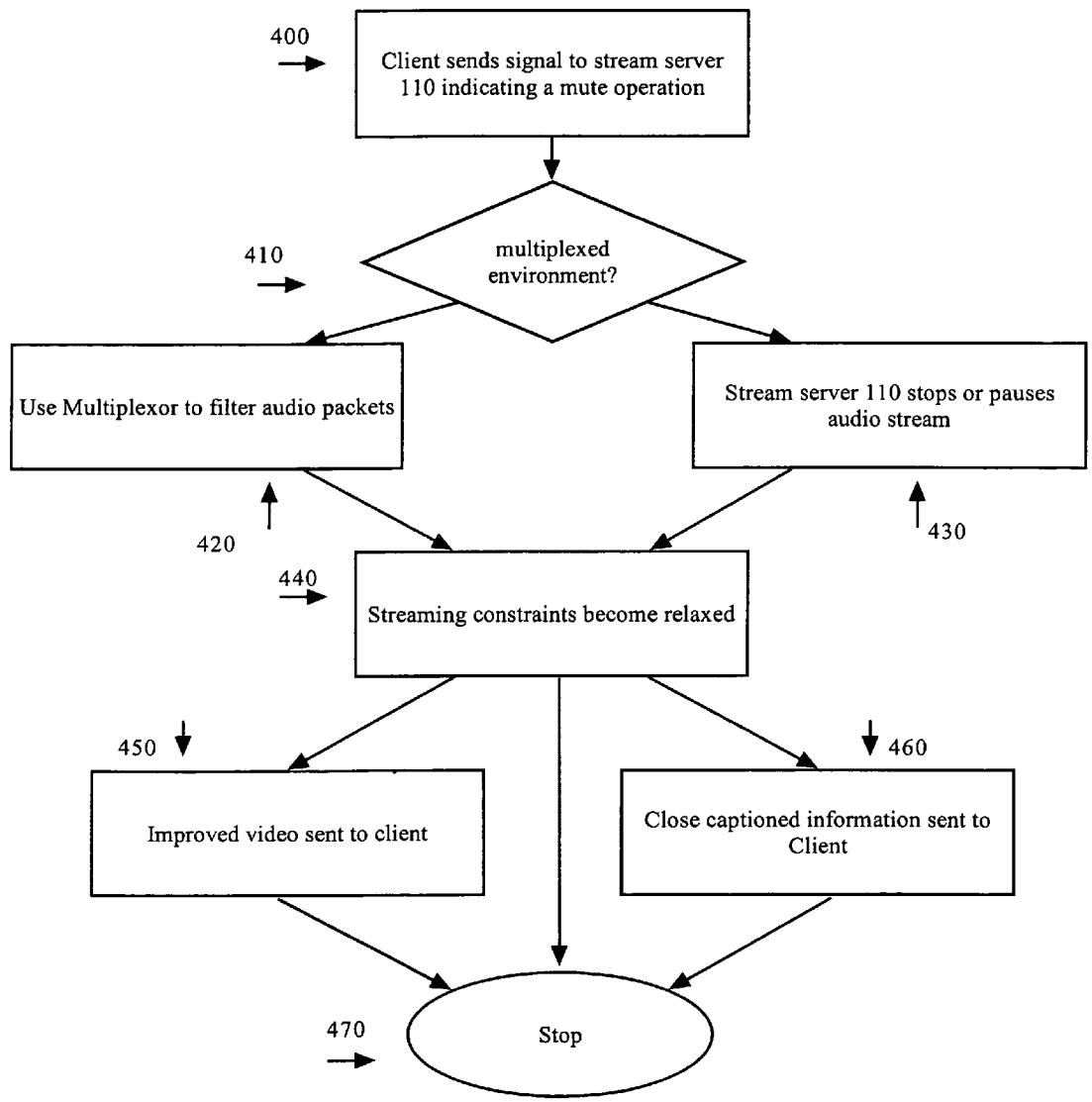
FIG. 4 is a flow chart illustrating the steps of dynamic quality adjustment according to an embodiment of the invention.

An exemplary description will now be provided with reference to FIG. 4 to illustrate the process of reclaiming unused bandwidth wherein the client mutes the audio in a digital media presentation. The client 160 sends a signal through the control network 120 to the stream server 110 to indicate that audio data is not to be sent to the client. The signal is sent using existing communication protocols, such as Real Time Streaming Protocol ("RTSP").

In one embodiment, the stream server 110 operates in a multiplexed environment, or an environment in which audio and visual data is sent to the client in a single stream, such as in MPEG. In response to receiving the signal, a multiplexor is used to examine and identify the packets for the particular SPTS being muted. The multiplexor then discards the identified audio packets for the muted SPTS and does not combine them in the output stream.

Figure 5:
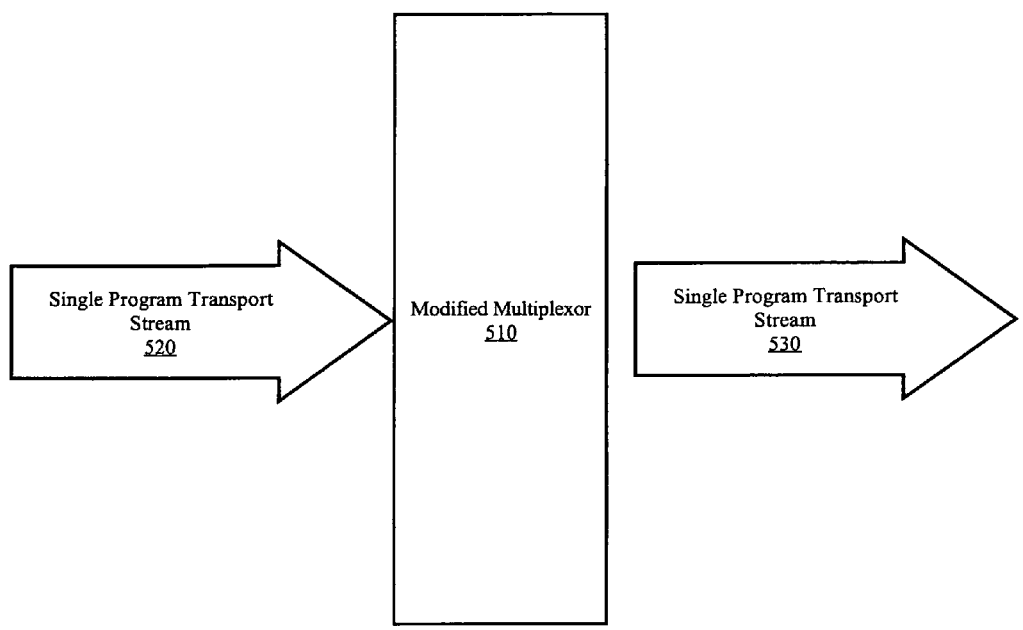
FIG. 5 illustrates the operation of a modified multiplexor according to an embodiment of the invention.

In another embodiment, the stream server 110 still operates in a multiplexed environment, but in response to receiving the signal, a modified multiplexor 510 is used to examine and identify the packets for the particular SPTS being muted, as shown in FIG. 5. The modified multiplexor 510 operates in substantially the same way as described in the prior section, except that it operates with only one input SPTS 520. The modified multiplexor 510 then filters and discards the identified audio packets for the input SPTS 520. The resulting output stream 530 from the modified multiplexor 510 contains the original media presentation, but not any audio packets, from the input SPTS 520.

In still another embodiment, the stream server 110 operates in a split-stream environment, or an environment in which audio and visual data are sent to the client in separate streams. In response to receiving the signal, the stream server 110 continues sending the video stream, but pauses or stops sending the audio stream to the signaling client. As the video is sent in a different stream to the signaling client than the audio, stopping the audio stream will not interrupt the video presentation to the signaling client.

As audio packets for the muted digital video stream are no longer sent to the client, the bandwidth previously allocated to the signaling client can be reclaimed. Accordingly, streaming constraints on the stream server 110 are reduced.

As mentioned previously, reclaiming bandwidth as a result of a client signaling to discontinue transmission of a particular type of information is not limited to audio information. A client may signal to indicate any particular type of information contained within the digital media stream is no longer to be sent to that client. For example, the client signals to indicate that visual information in no longer to be sent. Accordingly, the reclaimed bandwidth on the stream server 110 may be used to send improved quality information of the remaining types of information contained in the digital media stream, or send additional information. For example, if a client signals to indicate visual information is not to be sent, improved quality audio information may be sent. Examples of improved quality audio information include, but are not limited to, sending audio information in a format such as THX or Dolby, sending additional sound tracks, or sending information in surround sound.

In one embodiment, bandwidth reclaimed on the stream server 110 from one client may be utilized by any client of the stream server 110. In another embodiment, bandwidth reclaimed on the stream server 110 from one client may only be used by that client.

As mentioned above, one use of the reclaimed bandwidth is to provide improved quality. The quality of the video may be improved by modifying one or more of a video's characteristics. Examples of improving the quality of a video include, but are not limited to, increasing the rate of frame transmission, increasing color depth, and increasing the pixel density. In addition to, or instead of, increasing the quality of the video, the reclaimed bandwidth may be used to send or improve other data associated with the video. For example, the reclaimed bandwidth may be used to send closed-captioned information, additional information, or otherwise alter the appearance of the video in some form.

In other embodiments, the quality of the video may be improved through improved quantization. Improved quantization is achieved by collapsing similar states into a single state, thereby allowing more unique states to be identified. For example, assume each color used in a digital video presentation is assigned a 24 bit number. By grouping similar colors together and assigning them the same 24 bit number, more unique colors may be identified for use in the digital video with 24 bits.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of operating a stream server, the stream server causing data streams to be provided from one or more stored audio/visual files, the method comprising:

receiving a signal from a client device, said signal including an indication of a client requested presentation action that, when put into effect by the stream server, involves reducing a data rate of audio data of a first audio/visual stream being sent from the stream server to the client device or eliminating the transmission of the audio data of the first audio/visual stream to the client device;

implementing the client requested presentation action, said act of implementing the client requested presentation action including reducing the data rate of the audio data of the first audio/visual stream or eliminating the transmission of the audio data of the first audio/visual stream to the client device; and determining an amount that a data rate of a second audio/visual data stream may be increased as a result of an effect on transmission bandwidth corresponding to the reduction in the data rate of the audio data of the first audio/visual stream or the elimination of the audio data of the first audio/visual stream; and including both said first and second audio/video streams in different Single Program Transport Streams, each of said different Single Program Streams being part of a Multiple Program Transport Stream which includes both of said different Single Program Transport Streams.

2. A method of operating a stream server, the stream server causing data streams to be provided from one or more stored audio/visual files, the method comprising:

receiving a signal from a client device, said signal including an indication of a client requested presentation action that, when put into effect by the stream server, involves reducing a data rate of audio data of a first audio/visual stream being sent from the stream server to the client device or eliminating the transmission of the audio data of the first audio/visual stream to the client device;

implementing the client requested presentation action, said act of implementing the client requested presentation action including reducing the data of the first audio/visual stream or eliminating the transmission of the audio data of the first audio/visual stream to the client device; and determining an amount that a data rate of a second audio/visual data stream may be increased as a result of an effect on transmission bandwidth corresponding to the reduction in the data rate of the audio data of the first audio/visual stream or the elimination of the audio data of the first audio/visual stream; and wherein the act of reducing the data rate of audio data of the first data stream or eliminating the transmission of the audio data of the first audio/visual stream to the client device includes:

providing a stream of packets as part of a packet flow to a multiplexing device, said stream of packets including data packets which can be sent to the client device in said first audio/visual stream;

operating the multiplexer to perform a filtering operation on said stream of packets to reduce or eliminate the data rate of the audio data of the first audio/visual stream; and operating the multiplexer to output said first audio/visual stream.

3. A method of operating a stream server, the stream server causing data streams to be provided from one or more stored audio/visual files, the method comprising:

receiving a signal from a client device, said signal including an indication of a client requested presentation action that, when put into effect by the stream server, involves reducing a data rate of audio data of a first audio/visual stream being sent from the stream server to the client device or eliminating the transmission of the audio data of the first audio/visual stream to the client device;

implementing the client requested presentation action, said act of implementing the client requested presentation action including reducing the data rate of the audio data of the first audio/visual stream or eliminating the transmission of the audio data of the first audio/visual stream to the client device; and determining an amount that a data rate of a second audio/visual data stream may be increased as a result of an effect on transmission bandwidth corresponding to the reduction in the data rate of the audio data of the first audio/visual stream or the elimination of the audio data of the first audio/visual stream; and providing the second audio/video stream to a device other than the client device, and not providing the first audio/video stream to the device other than the client device.

4. A method of operating a stream server, the stream server causing data streams to be provided from one or more stored audio/visual files, the method comprising:

the stream server providing to one or more client devices a first audio/visual stream and a second audio/visual stream;

receiving signal from one of the client devices, said signal including an indication of a client requested presentation action that, when put into effect by the stream server, involves reducing a data rate of audio or video data of the first audio/visual stream or eliminating the transmission of the audio or video data of the first audio/visual stream;

implementing the client requested presentation action, said act of implementing the client requested presentation action including reducing a data rate of audio or video data of the first audio/visual stream or eliminating the transmission of the audio or video data of the first audio/visual stream; and determining whether a third audio/visual stream may be streamed as a result of an effect on transmission bandwidth corresponding to a reduction in the data rate of audio or video data of the first audio/visual stream or eliminating the transmission of the audio or video data of the first audio/visual stream, and transmitting the first, second, and third audio/video streams each to different client devices.

5. A method of operating a stream server, the stream server causing data streams to be provided from one or more stored audio/visual files, the method comprising:

receiving a signal from a client device, said signal including an indication of a client requested presentation action that, when put into effect by the stream server, involves increasing a data rate of audio data of a first audio/visual stream being sent from the stream server to the client device;

implementing the client requested presentation action, said act of implementing the client requested presentation action including increasing the data rate of the audio data of the first audio/visual stream to the client device; and determining an amount that a data rate of a second audio/visual data stream should be reduced as a result of an effect on transmission bandwidth corresponding to the increase in the data rate of the audio data of the first audio/visual stream and including both said first and second audio/visual streams in different Single Program Transport Streams, each of said different Single Program Streams being part of a Multiple Program Transport Stream which includes both of said different Single Program Transport Streams.

6. A method of operating a stream server, the stream server causing data streams to be provided from one or more stored audio/visual files, the method comprising:

receiving a signal from a client device, said signal including an indication of a client requested presentation action that, when put into effect by the stream server, involves increasing a data rate of audio data of a first audio/visual stream being sent from the stream server to the client device;

implementing the client requested presentation action, said act of implementing the client requested presentation action including increasing the data rate of the audio data of the first audio/visual stream to the client device; and determining an amount that a data rate of a second audio/visual data stream should be reduced as a result of an effect on transmission bandwidth corresponding to the increase in the data rate of the audio data of the first audio/visual stream, and providing the second audio/visual stream to a device other than the client device.

7. A method of operating a stream server, the stream server causing data streams to be provided from one or more stored audio/visual files, the method comprising:

receiving a signal from a client device, said signal including an indication of a client requested presentation action that, when put into effect by the stream server, involves increasing a data rate of audio data of a first audio/visual stream being sent from the stream server to the client device;

implementing the client requested presentation action, said act of implementing the client requested presentation action including increasing the data rate of the audio data of the first audio/visual stream to the client device; and determining an amount that a data rate of a second audio/visual data stream should be reduced as a result of an effect on transmission bandwidth corresponding to the increase in the data rate of the audio data of the first audio/visual stream, and providing a stream of packets as part of a packet flow to a modified multiplexing device, said stream of packets including data packets which can be sent to the client device in said second audio/visual stream;

operating the modified multiplexer to perform a filtering operation on said stream of packets to control the amount of data included in the second audio/visual stream, said filtering being performed to reduce the data rate in response to the client required action; and operating the modified multiplexer to output said second audio/visual stream.

8. A computer program product, comprising instructions that, when executed by a stream server device that causes data streams to be provided from one or more stored audio/visual files, causes the stream server device:

to interpret an indication of a client requested presentation action that will affect the bandwidth requirements of audio data of a first audio/visual stream that the stream server is streaming to the client device to identify the action from the indication and put the action into effect, with the result that the rate of the audio data of the first audio/visual stream to the client is changed; and to determine an amount that a video streaming rate of a second audio/visual data stream should be changed as a result of bandwidth effects of the changed rate for the audio data of the first audio/visual stream, and to change video streaming rate of the second audio/visual data stream according to the amount;

wherein the instructions to enable the stream server to determine an amount that a rate of a second audio/visual stream should be changed comprise:

instructions to enable the stream server to determine an amount to change a rate of a second audio/visual stream that is part of a different Single Program Transport Stream than the first audio/visual stream, but which is part of the same Multiple Program Transport Stream as the first audio/visual stream.

9. A computer program product, comprising instructions that, when executed by a stream server device that causes data streams to be provided from one or more stored audio/visual files, causes the stream server device:

to interpret an indication of a client requested presentation action that will affect the bandwidth requirements of audio data of a first audio/visual stream that the stream server is streaming to the client device;

to identify the action from the indication and put the action into effect, with the result that the rate of the audio data of the first audio/visual stream to the client is changed; and to determine an amount that a video streaming rate of a second audio/visual data stream should be changed as a result of bandwidth effects of the changed rate for the audio data of the first audio/visual stream, and to change video streaming rate of the second audio/visual data stream according to the amount; and instructions to enable the stream server to stream the first audio/visual stream to a multiplexing device at a same rate as before the action was put into effect, and to cause the first audio/visual stream rate to be changed at the multiplexing device output.

10. A computer program product, comprising instructions that, when executed by a stream server device that causes data streams to be provided from one or more stored audio/visual files causes the stream server device:

to interpret an indication of a client requested presentation action that will affect the bandwidth requirements of audio data of a first audio/visual stream that the stream server is streaming to the client device;

to identify the action from the indication and put the action into effect, with the result that the rate of the audio data of the first audio/visual stream to the client is changed; and to determine an amount that a video streaming rate of a second audio/visual data stream should be changed as a result of bandwidth effects of the changed rate for the audio data of the first audio/visual stream, and to change video streaming rate of the second audio/visual data stream according to the amount, and instructions to enable the stream server to provide the second audio/visual stream to a device other than the client device.

\* \* \* \* \*